W. KELLER.
PLUMBING SYSTEM.
APPLICATION FILED AUG. 3, 1910.
991,852.
Patented May 9, 1911.
2 SHEETS—SHEET 1.
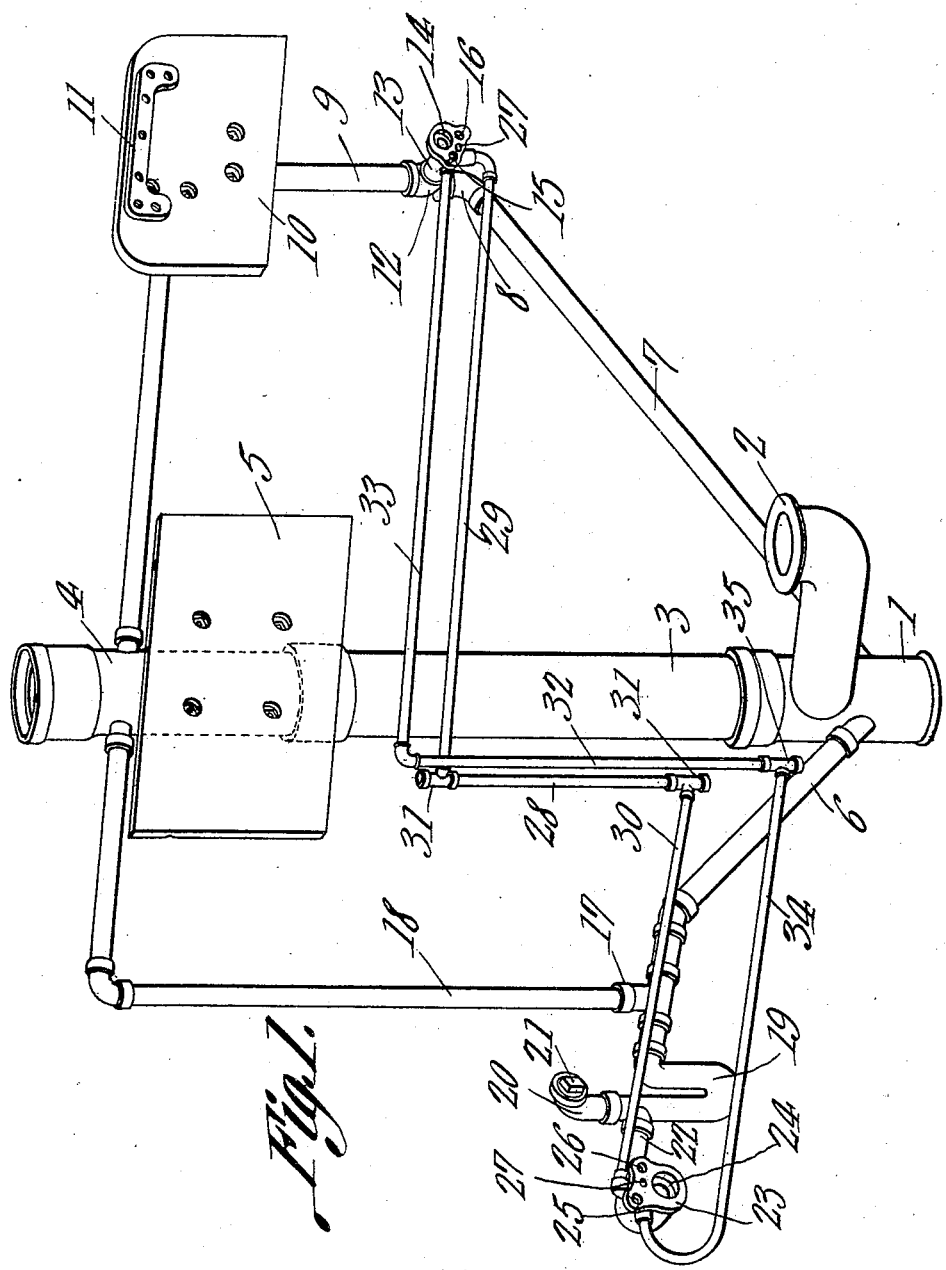
Witnesses
William Keller, Inventor
by C. A. Snow & Co.
Attorneys

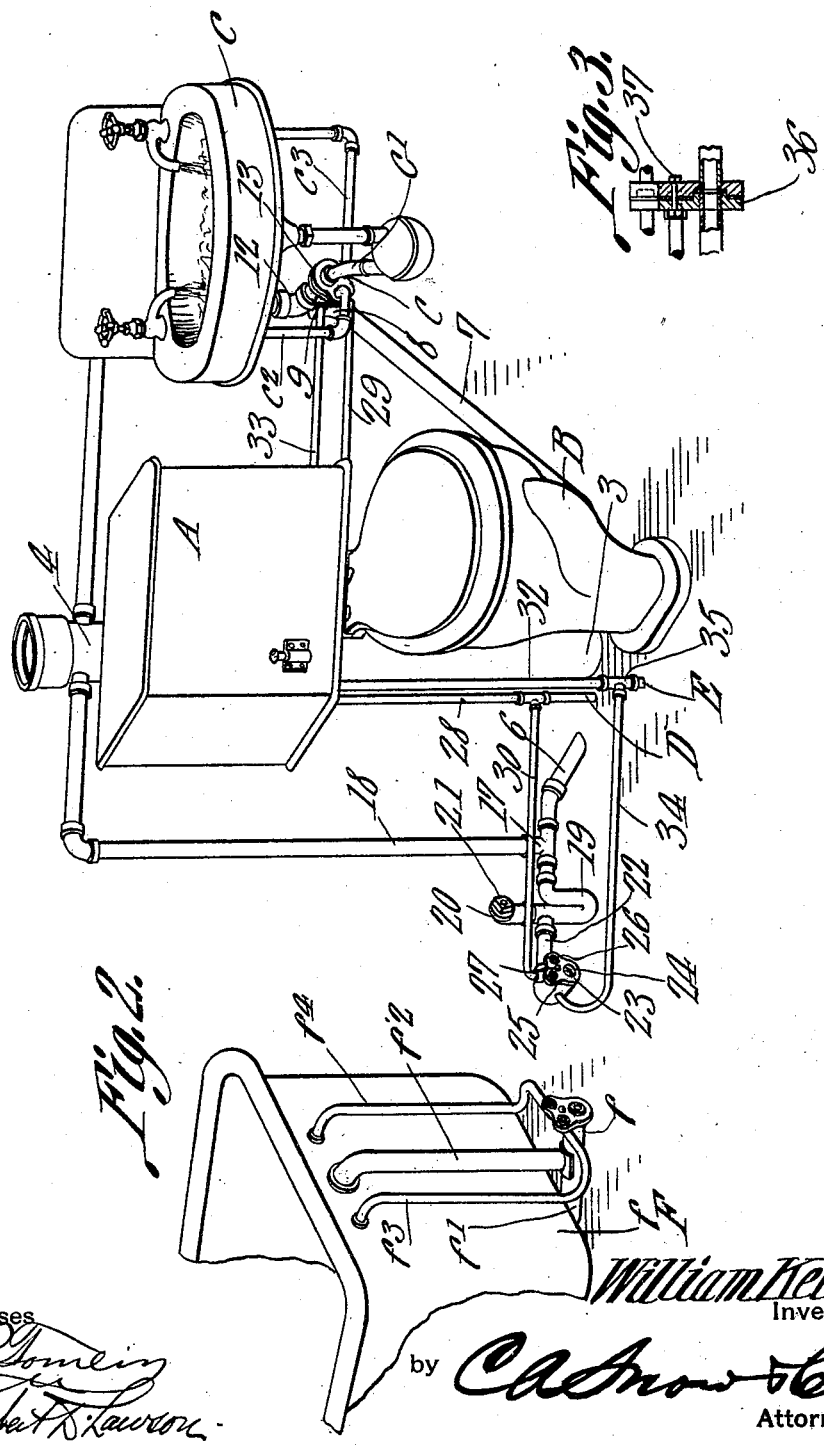

UNITED STATES PATENT OFFICE.

WILLIAM KELLER, OF CLEVELAND, OHIO.

PLUMBING SYSTEM.

991,852.  Specification of Letters Patent.  Patented May 9, 1911.

Application filed August 3, 1910. Serial No. 575,204.

*To all whom it may concern:*

Be it known that I, WILLIAM KELLER, a citizen of the United States, residing at Cleveland, in the county of Cuyahoga and State of Ohio, have invented a new and useful Plumbing System, of which the following is a specification.

This invention relates to plumbing systems and has for its object the provision, as an article of manufacture, of a pipe structure adapted to be installed in a bath room without requiring the services of a skilled mechanic, the structure thus being particularly adapted for use in rural communities, the pipe structure including means whereby it can be readily attached to a tub and lavatory.

With the foregoing and other objects in view the invention consists in certain novel details of construction and combinations of parts hereinafter more fully described and pointed out in the claims.

In the accompanying drawings the preferred form of the invention has been shown.

In said drawings: Figure 1 is a perspective view of the structure constituting the present invention. Fig. 2 is a perspective view showing the same set up with the various appliances combined therewith, a portion of the tub being shown adjacent but separated from the structure. Fig. 3 is an enlarged section through one of the joints.

Referring to the figures by characters of reference 1 designates a special fitting of cast iron or the like, said fitting being a combined sanitary T and double Y, said T carrying a closet flange 2 such as ordinarily provided. A soil pipe 3 is secured to and extends upwardly from the fitting 1 and has a cross fitting 4 at the upper end thereof. The fitting 1 and pipe 3 with the cross fitting 4 constitute the main support of the structure constituting the present invention. A board 5 is secured in any suitable manner to the upper portion of the pipe 3 and to the fitting 4 and constitutes a backing to which the tank A may be attached, it being understood that the bowl B is to be secured in the usual manner to the flange 2.

Upwardly diverging waste pipes 6 and 7 extend from the fitting 1, the pipe 7 being connected by an elbow 8 to a vent pipe 9 which extends upwardly for a desired distance from the elbow and then extends inwardly to the fitting 4, the upwardly extending portion of this vent pipe constituting the support for a board 10 on which is mounted a bracket 11 adapted to support the lavatory C. A T 12 is connected to the pipe 9 close to the elbow 8 and has a special form of flanged union 13 extending from it, this union being formed with a large waste opening 14 opening into the T 12 and being also provided with openings 15 and 16.

The pipe 6 is coupled to a T 17 from which extends a vent pipe 18 opening into the fitting 4. A bath trap 19 opens into the waste pipe 6 close to the T 17 and has a clean-out 20 thereon normally closed by a screw cap or plug 21. A pipe 22 extends from the trap and opens into a flanged union 23 similar to the union 13 heretofore referred to, there being a waste opening 24 within this union and which communicates with the interior of the pipe 22 while additional openings 25 and 26 are also formed within the union. Each of the unions 13 and 23 has a bolt receiving opening 27 adjacent the center thereof. A cold water pipe 28 is located close to and preferably parallel with the pipe 3 and has branch pipes 29 and 30 secured to the unions 13 and 23 respectively and communicating with the openings 16 and 26. A T 31 is located at each end of the pipe 28 so as to facilitate its attachment to a pipe opening into the tank A and to a supply pipe D. A hot water pipe 32 is arranged preferably close to the pipe 28 and parallel therewith, the upper portion of this pipe being extended laterally as at 33 and communicating with the opening 15 in union 13. A branch pipe 34 extends from the pipe 32 and communicates with the opening 25 in union 23. This pipe 32 has a T 35 at its lower end whereby it may be readily attached to a supply pipe E.

It is to be understood that the pipe structure shown in Fig. 1 and which has been described in detail, is to be placed on the market as an article of manufacture and is adapted to be set up by persons unskilled in the plumber's art. In order to install the structure, it becomes merely necessary to attach the fitting 1 to the sewer and to connect the fitting 4 to a stack. The pipe T 31 can then be attached to a supply pipe and the T 35 can be attached to a hot water supply pipe. The tank A can then be mounted on the backing board 5 and connected to the T 31 at the upper end of pipe 28 and the bowl B may be mounted on the flange 2 in the usual manner. A lavatory could then be hung from the bracket 11 and this lavatory is to be provided with a fitting $c$ similar to the fitting 13 and into which opens a waste pipe $c'$, a hot water pipe $c^2$ and a cold water pipe $c^3$. When this fitting $c$ is placed adjacent the fitting 13 with a gasket 36 between the two unions, a bolt 37 may be extended through the openings 27 in the unions and will thus tightly clamp said unions upon the gasket and with the waste openings in register and with each water opening in one union registering with the corresponding aperture in the other union.

It is intended to furnish the bath tub F with a fitting $f$ similar to the union 23, this fitting consisting of a waste pipe $f^1$ into which opens an overflow pipe $f^2$, and a cold water pipe $f^3$ and a hot water pipe $f^4$. When the fitting $f$ is secured to the fitting 23, by means of a bolt 37 extending through the openings 27, the waste pipe $f'$ will communicate with the waste pipe 22 and the hot and cold water pipes on the tub will communicate with the corresponding pipes of the main pipe structure. It is to be understood that this pipe structure can be made so as to bring the tub to either side of the fitting 1, to meet the desires of the purchaser and, moreover, the fitting or union 23 can be so constructed as to enable the tub to be placed in any desired relation to the pipe 22.

Various changes can of course be made in the construction and arrangement of the parts without departing from the spirit or sacrificing any of the advantages of the invention as defined in the appended claims.

What is claimed is:—

1. As an article of manufacture, a combined double Y and T fitting having a bend provided with a bowl flange, a waste pipe extending from said fitting, a cross fitting on said pipe for attachment to a stack, unions for attachment respectively to a lavatory and a tub, waste pipes extending from said unions to the double Y fitting, and vent pipes extending from said unions to the cross fitting.

2. As an article of manufacture, a pipe structure including a combined Y and T fitting, having a bend and a bowl flange, a cross fitting, a waste pipe connecting said fittings, means supported by said pipe for engaging and holding a tank, a union, a waste pipe connecting said union with the Y fitting, a vent pipe extending from said union to the cross fitting, and a supporting bracket carried by said vent pipe.

3. As an article of manufacture, a pipe structure including a combined double Y and T fitting, unions, each union having a waste opening and hot and cold water receiving openings, a waste pipe connecting each union with the fitting, hot and cold water pipes connecting the unions and communicating with the respective openings, each of said pipes including means for engaging a supply pipe, means for connecting the fitting to a stack, and vent pipes for conducting gases from the waste pipes to said connecting means.

In testimony that I claim the foregoing as my own, I have hereto affixed my signature in the presence of two witnesses.

WILLIAM KELLER.

Witnesses:
M. L. QUILTY,
C. J. NEAL.